Aug. 20, 1929.    A. CASTELLANI    1,725,617
COMBINED ALTIMETER AND TELEMETER
Filed Oct. 25, 1926
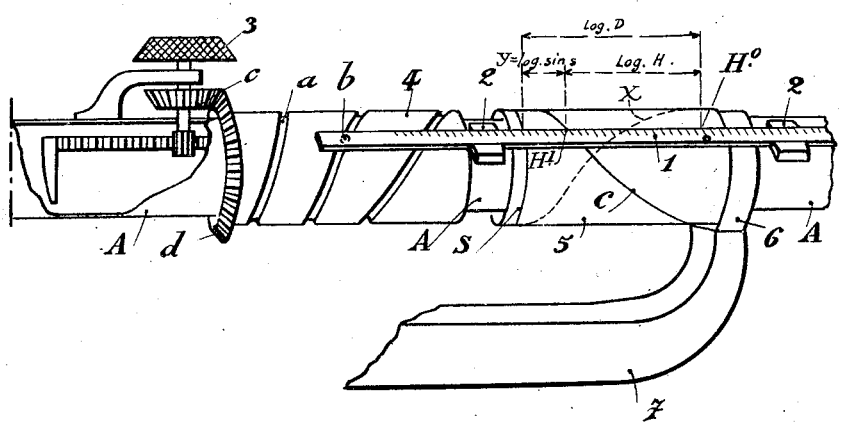
Inventor,
Antoine Castellani
By
Mauro, Cameron, Lewis & Kerkam,
attorneys Patented Aug. 20, 1929.

1,725,617

UNITED STATES PATENT OFFICE.

ANTOINE CASTELLANI, OF PARIS, FRANCE, ASSIGNOR TO SOCIETE D'OPTIQUE ET DE MECANIQUE DE HAUTE PRECISION, OF PARIS, FRANCE, A LIMITED JOINT-STOCK COMPANY.

COMBINED ALTIMETER AND TELEMETER.

Application filed October 25, 1926, Serial No. 144,097, and in France January 26, 1926.

The subject of the present invention is a combined altimeter and telemeter more particularly adapted for use in firing against aircraft. The device according to the invention, combined with a telemeter of known type enables the following problem to be solved:

The angle of site and the distance being given of the target by a telemetric observation, to be able to read the altitude and, in addition, the corresponding horizontal range directly upon a scale.

The three elements, distance D, angle of site $s$ and altitude H are, as it is known, related by the equation $H = D$, sin. $s$. The two independent variables D and $s$ are given, upon known telemeters, for example by the following means:

1. The distance D by the rotation of a knob which the telemeter operator turns through an amount which is a function of D in order to obtain a measure of this distance. The rotation of the knob decreases proportionally and inversely to the increase in distance D in the case of a telemeter provided with a deflecting prism.

2. The angle of site $s$, by the rotation of the telemeter tube.

One form of the present invention is illustrated somewhat diagrammatically in the perspective view of the accompanying drawings, but it is to be expressly understood that the drawings are for purposes of illustration only and are not designed as a definition of the limits of the invention, reference being had to the appended claims for this purpose. The illustrated structure comprises:

(a) A scale rod 1 upon which is read the altitude H, which scale rod is graduated in such a way that the distance comprised between the origin $H^0$, (the zero point of the scale), corresponding to a kilometer, and any division line $H^1$ will be proportional to log. $H^1$. (It will be assumed that the coefficient of proportionality is equal to 1 in order to simplify the description.) This scale rod 1 is carried by two guides 2, mounted upon the tube A of the telemeter of any suitable type, such as a telemeter embodying a movable deflecting prism, in such a way that the graduated edge of the scale is parallel to the axis of the tube. The only movement the scale rod can make relatively to the tube is therefore a movement of translation parallel to the graduated edge of the said rod and consequently also parallel to the axis of the tube.

(b) A cam 4 controlled by the rotation of the knob 3 measuring the distances D and impressing upon the scale rod 1 a movement of translation parallel to its graduated edge equal to log. D the direction of the movement being such that when the distance increases the movement of the rod is in the direction in which its graduations decrease, i. e., from left to right as viewed in the drawing.

This cam may, if desired, take the form of a cylinder 4 provided with a groove $a$ in which engages a stud $b$ secured to the scale rod. The axis of the cylinder 4 is parallel to the axis of the tube and its rotation is controlled by the knob 3, through the medium of pinions, $c, d$.

(c) A surface 5 which always remains in contact with the graduated edge of the scale rod along a generating line, whatever be the angle of site at which the telemeter is aimed, the movement of which surface relatively to the said scale rod is proportional to the angle of site $s$. Upon this surface is traced a curve such that the points where it meets the graduated edge of the scale rod, on the one hand for an angle of site of 90° and on the other hand for an angle of site $s$, mark off a length equal to log. sin. $s$ in a direction such that, when the angle of site decreases, the point of intersection of this curve with the scale moves in the direction of decreasing values of H.

The position of this curve upon the surface is chosen in such a way that, for a site angle of 90°, its point of intersection with the scale rod gives a reading of the altitude H equal to the value of the distance D which corresponds to the position of the scale rod at the moment the reading is taken. It is, in fact, obvious that for a site angle of 90° the altitude is equal to the distance.

This surface, in the illustrated embodiment, is constituted by a cylinder 5 formed integrally with one of the fixed collars 6 which are integral or virtually integral with the support 7, that is to say, a cylinder 5 which remains stationary when the telemeter is aimed for site, the generating lines of which cylinder represent geometrically the positions taken up by the graduated edge of the scale rod when the telemeter is rotated for aiming in site, the tube A carrying the scale rod 1 along with it during this rotation. The movement of the surface of the cylinder 5 relatively to the scale rod and at right angles to its graduated edge is therefore proportional to the angle of site $s$.

If an axis of abscissæ $s$, determined by the intersection of the cylinder 5 with a plane normal to the generating lines, and an axis of ordinates $y$ determined by a generating line of the said cylinder are traced upon the said cylinder 5 the equation of the curve traced upon the developed cylinder is $y=$log. sin. $s$ on condition that the origin of the co-ordinates is taken as that point on the cylinder which, for a site angle of 90°, coincides with that point on the scale giving, upon the latter, a reading of the altitude H equal to the distance D which corresponds to the position of the scale rod. The positive direction of the $y$ axis is chosen such that, when the site angle decreases, the intersection of the curve with the scale moves upon the latter towards the decreasing values of H.

The device operates in the following manner:

When it is aimed for site the telemeter turns in its collars carrying along in its rotation the scale rod 1 the graduated edge of which coincides successively with the different generating lines of the cylinder 5. At the moment when the sight angle $s$ of the target is reached the edge of the scale meets the axis (S) of the values of $s$ and the curve C, traced upon the cylinder, at two points the distance between which is equal to log. sin. $s$.

Further, in order to measure the distance the telemeter operator manipulates the knob 3 which, through the medium of the grooved cylinder 4, impresses a movement of longitudinal translation upon the scale rod along its graduated edge. At the moment when the correct distance is reached the scale rod has effected a translational movement equal to log. D from the position it occupied for D=1 km. (log. D=0).

It is then clear:

(a) That the distance comprised between the origin of the scale rod (point H° marked 1 Km.) and the intersection of the latter with the axis of the values of $s$, S, traced upon the cylinder 5 is equal to log. D;

(b) That the distance comprised between the intersection of the scale rod with the $s$ axis and its intersection with the curve C traced upon the same cylinder 5 is equal to log. sin. $s$. As the graduation of the scale is logarithmic and the directions are all in conformity to those indicated it follows that:

(1) The intersection of the scale rod with the $s$ axis enables the distance D to be read.

(2) That the distance comprised between the origin of the scale and its intersection with the curve traced upon the cylinder 5 is equal to log. D+log. sin. $s$, which sum is none other than log. H because H=D sin. $s$. The altitude can therefore be read directly at the point of intersection of the scale with this curve. If it is also desired to know the horizontal range of the target, $d=$D cos. $s$, it is sufficient to trace in addition upon the cylinder 5, making use of the coordinate axes already employed, a curve $x$ which, upon the developed cylinder has the equation $y=$log. cos. $s$. The intersection of this curve with a scale will enable the horizontal range $d$ to be read directly.

Naturally the invention must be understood to be capable of employment in any altimeter system employing a scale rod graduated in logarithms, this scale rod being given a longitudinal movement of translation proportional to log. D by means of a cam actuated by the member measuring distances, the reading of the altitude being obtained by the intersection of this scale rod with a curve traced upon a surface, this surface making a movement proportional to the site angle relatively to the scale rod.

While only one embodiment of the invention has been illustrated in the accompanying drawings, reference will be had to the appended claims for a definition of the limits of the invention.

What is claimed is:

1. In combination with a telemeter of the type embodying a member movable as a function of the distance to be measured, a movable cam, motion transmitting means operatively connected to said cam and member, a distance scale member actuated by said cam, and a graph member associated with said scale member for enabling the altitude of the target, or the horizontal range of the same, or both to be read directly from said last named member.

2. In combination with a telemeter of the type embodying a tube and a member carried by the tube adapted for movement as a function of the distance D of a target from the point of observation, a distance scale carried by said tube, means actuated by said member for moving said scale, and a graph member associated with said scale, said scale being movable in both rectilinear and curvilinear paths relative to said graph member.

3. A device for measuring altitudes comprising, in combination with a telemeter including a distance measuring member, a graduated scale rod adapted to be moved in the direction of its graduation in proportion to the logarithm of the distance D of a target from the point of observation, guides for said rod carried by the telemeter, means operatively connected to said member for moving said rod relative to said guides, graph means carried by said telemeter and contacting with said rod, and means for maintaining said graph means in operative relation with said rod.

4. A device of the class described comprising, in combination with a rotatably mounted telemeter embodying a member movable as a function of the distance to be measured, a scale carried by said telemeter, motion transmitting means operatively connected to said member and scale whereby the latter may be moved proportionally to the logarithm of the distance D of a target from the point of observation, and a stationary graph member, having a plurality of curves thereon, associated with said scale whereby the altitude, distance, and horizontal distance of the target may be read directly from said scale.

5. A device of the class described comprising, in combination with a telemeter embodying a distance measuring knob movable as a function of the distance to be measured, a scale slidably carried by said telemeter, a cam operatively connected to said knob and scale for moving the latter proportionally to the logarithm of the distance D of a target from the point of observation, and a cylindrical graph member surrounding said telemeter adjacent said scale, said telemeter being movable relative to said graph member.

6. In combination with a telemeter, a distance scale carried by the telemeter and movable therewith, means for moving said scale in proportion to the logarithm of the distance D of a target from the point of observation, and a graph member associated with said scale, the latter being adapted for movement through angles proportional to the angles of site relative to said graph member.

7. In combination with a telemeter of the type embodying a tube rotatably mounted in a support, a distance scale carried by said tube and rotatable therewith, means for moving said scale in proportion to the logarithm of the distance D of a target from the point of observation, relatively to the tube, and a graph member associated with said scale and tube, said scale being movable through an angle proportional to the angle of site relative to said graph member.

In testimony whereof I have signed this specification.

ANTOINE CASTELLANI.